United States Patent
Ogino

(10) Patent No.: US 8,327,054 B2
(45) Date of Patent: Dec. 4, 2012

(54) DATA CHECK CIRCUIT FOR CHECKING PROGRAM DATA STORED IN MEMORY

(75) Inventor: Naoyuki Ogino, Sano (JP)

(73) Assignees: Semiconductor Components Industries, LLC, Phoenix, AZ (US); Sanyo Semiconductor Co., Ltd., Gunma (JP)

(*) Notice: Subject to any disclaimer, the term of this patent is extended or adjusted under 35 U.S.C. 154(b) by 199 days.

(21) Appl. No.: 12/792,656

(22) Filed: Jun. 2, 2010

(65) Prior Publication Data

US 2010/0306439 A1 Dec. 2, 2010

(30) Foreign Application Priority Data

Jun. 2, 2009 (JP) ................................. 2009-133427

(51) Int. Cl.
G06F 13/362 (2006.01)
(52) U.S. Cl. .................... 710/113; 710/110; 710/309
(58) Field of Classification Search .......... 710/104–119, 710/240–244, 62–64, 72, 6–8, 22–24, 309; 713/1; 714/736
See application file for complete search history.

(56) References Cited

U.S. PATENT DOCUMENTS

| | | | | |
|---|---|---|---|---|
| 5,831,871 A * | 11/1998 | Iadonato et al. | ............... | 716/111 |
| 6,578,091 B1 * | 6/2003 | Musil | ............................... | 710/8 |
| 6,711,059 B2 * | 3/2004 | Sinclair et al. | ............ | 365/185.11 |
| 6,820,152 B2 * | 11/2004 | Kanzaki et al. | ............... | 710/244 |
| 6,987,684 B1 | 1/2006 | Branth et al. | | |
| 7,103,684 B2 * | 9/2006 | Chen et al. | ........................ | 710/62 |
| 7,600,051 B2 * | 10/2009 | Clifton et al. | ...................... | 710/6 |
| 7,908,466 B2 * | 3/2011 | Oh et al. | ............................. | 713/1 |
| 2002/0161956 A1 * | 10/2002 | Kanzaki et al. | ............... | 710/240 |
| 2004/0123201 A1 * | 6/2004 | Nguyen et al. | ................ | 714/736 |
| 2005/0188121 A1 * | 8/2005 | Cho | ................................ | 710/22 |
| 2007/0022225 A1 * | 1/2007 | Nair et al. | ......................... | 710/22 |
| 2008/0228984 A1 * | 9/2008 | Yu et al. | ......................... | 710/308 |

FOREIGN PATENT DOCUMENTS

JP 2004-38541 2/2004

OTHER PUBLICATIONS

Extended European Search Report for Application No. 10164519.0-2212 dated Sep. 22, 2010, (5 pages).
Patent Abstracts of Japan for patent application with Publication No. 2004-038541, Publication Date: Feb. 5, 2004, 1 page.
Mechanical English translation for Japanese patent application with Publication No. 2004-38541, Publication Date: Feb. 5, 2004, 17 pages.

* cited by examiner

Primary Examiner — Raymond Phan
(74) Attorney, Agent, or Firm — Osha Liang LLP

(57) ABSTRACT

A data check circuit comprising: a request signal output circuit configured to output a request signal for requesting occupation of a bus to an arbitration circuit configured to arbitrate the occupation of the bus, when a CPU connected, as a bus master, with the bus for accessing a memory outputs an instruction signal for providing an instruction for starting detection of whether or not data stored in the memory is correct; a data acquisition circuit configured to acquire data stored in the memory through the bus, when the arbitration circuit outputs a permission signal for permitting the occupation of the bus based on the request signal; and a data processing circuit configured to perform processing for detecting whether or not the acquired data is correct, the acquired data acquired by the data acquisition circuit.

7 Claims, 7 Drawing Sheets

US 8,327,054 B2

DATA CHECK CIRCUIT FOR CHECKING PROGRAM DATA STORED IN MEMORY

CROSS-REFERENCE TO RELATED APPLICATION

This application claims the benefit of priority to Japanese Patent Application No. 2009-133427, filed Jun. 2, 2009, of which full contents are incorporated herein by reference.

BACKGROUND OF THE INVENTION

1. Field of the Invention

The present invention relates to a data check circuit.

2. Description of the Related Art

A system LSI including CPU (Central Processing Unit) may be provided with a memory for storing program data of the CPU on the outside of the system LSI so as to flexibly change processing executed by the CPU, for example. In such a system, in order to facilitate the acquisition of the program data by the CPU, generally, the program data is transferred from an external memory to RAM (Random Access Memory) included in the system LSI, for example. If the program data is transferred to the RAM, the CPU executes the program data stored in the RAM so as to execute various processing.

When program data is transferred from an external memory to the internal RAM, incorrect program data may be stored in the RAM due to the effect of noise such as static electricity. Even if the program data is correctly stored in the RAM, an error may occur in the program data afterward due to the effect of noise. Therefore, the CPU is required to check whether or not an error occurs in the program data stored in the RAM, for example, on a regular basis (see, e.g., Japanese Patent Application Laid-Open Publication No. 2004-38541).

Since the CPU executes and checks the program data, the CPU is able to check the program data in such appropriate timing that a load of the CPU is small, for example. However, as the program data stored in the RAM increases in data size, a period of checking the program data generally increases. Therefore, even if the CPU starts checking the program data in appropriate timing, the load is applied in checking the program data, thereby reducing the efficiency of the processing that should originally be executed by the CPU, which is a problem.

SUMMARY OF THE INVENTION

A data check circuit according to an aspect of the present invention, comprises: a request signal output circuit configured to output a request signal for requesting occupation of a bus to an arbitration circuit configured to arbitrate the occupation of the bus, when a CPU connected, as a bus master, with the bus for accessing a memory outputs an instruction signal for providing an instruction for starting detection of whether or not data stored in the memory is correct; a data acquisition circuit configured to acquire data stored in the memory through the bus, when the arbitration circuit outputs a permission signal for permitting the occupation of the bus based on the request signal; and a data processing circuit configured to perform processing for detecting whether or not the acquired data is correct, the acquired data acquired by the data acquisition circuit.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which:

FIG. 2 is a diagram illustrating a configuration of a data check circuit 52a;

DETAILED DESCRIPTION OF THE INVENTION

At least the following details will become apparent from descriptions of this specification and of the accompanying drawings.

Figure 1:
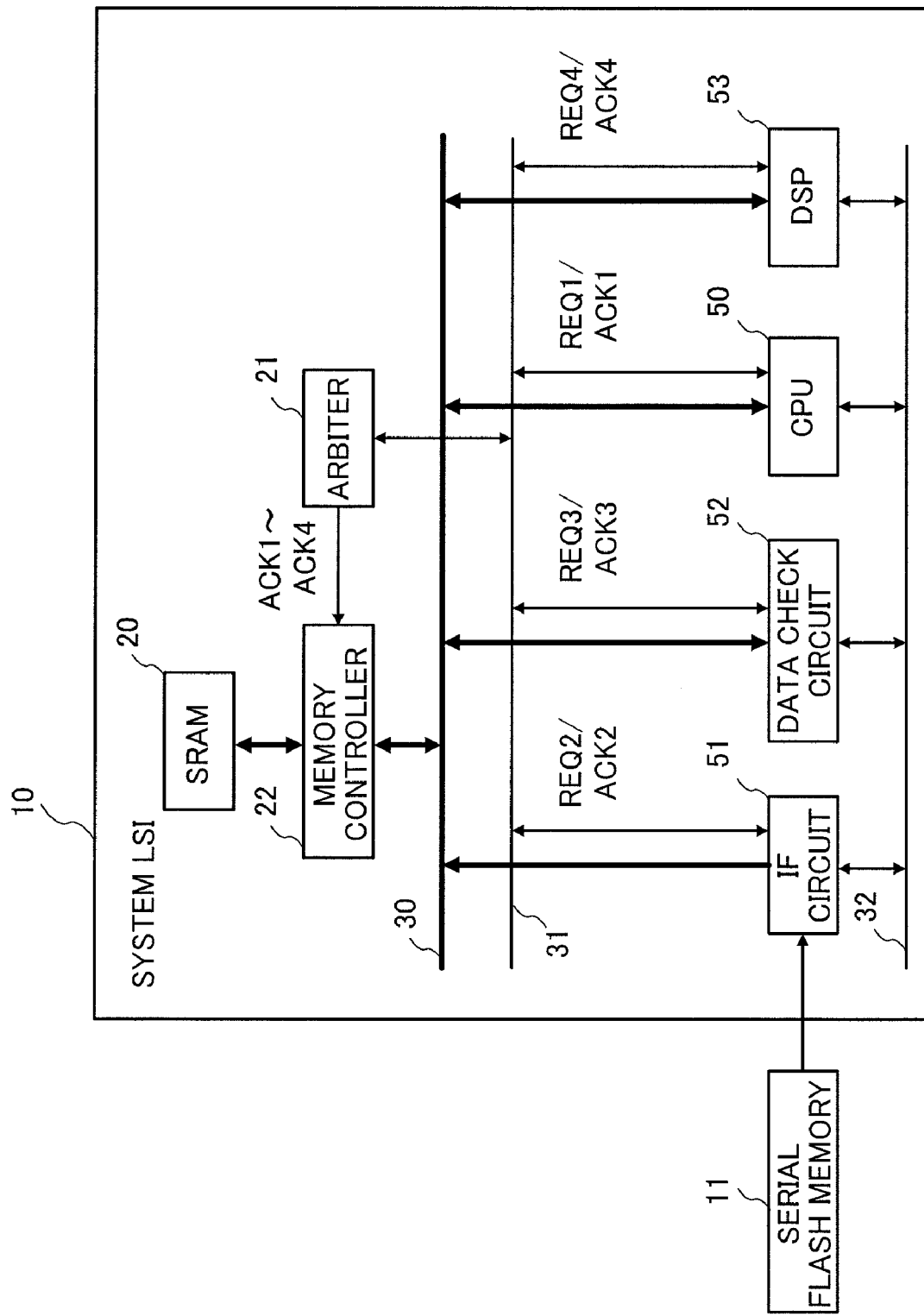
FIG. 1 is a diagram illustrating a configuration of a system LSI 10 according to an embodiment of the present invention.

FIG. 1 depicts a configuration of a system LSI 10 according to one embodiment of the present invention. The system LSI 10 includes SRAM (Static Random Access Memory) 20, an arbiter 21, a memory controller 22, buses 30 to 32, a CPU 50, an IF (Interface) circuit 51, a data check circuit 52, and a DSP (digital signal processor) 53. The system LSI 10 is an integrated circuit for controlling an optical disc, for example. The circuits of the system LSI 10 operate based on a clock signal from a clock generating circuit (not shown) of the CPU 50, for example.

A serial flash memory 11 stores program data to be executed by the CPU 50. The serial flash memory 11 generates and stores an error-detection code such as a checksum or parity, based on the stored program data.

The SRAM 20 (memory) stores the program data of the CPU 50 transferred from the serial flash memory 11, data to be processed by the DSP 53, etc.

The arbiter 21 (arbitration circuit) is a circuit configured to arbitrate the right to use the bus 30 for accessing the SRAM 20. In an embodiment according to the present invention, the CPU 50, the IF circuit 51, the data check circuit 52, and the DSP 53 correspond to bus masters of the bus 30. An address for specifying a storage area of the SRAM 20, data to be stored in the SRAM 20, etc., are output to the bus 30. Request signals REQ1 to REQ4 for requesting occupation of the bus 30 are input to the arbiter 21 through the bus 31 from the CPU 50, the IF circuit 51, the data check circuit 52, and the DSP 53, respectively. The arbiter 21 outputs permission signals ACK1 to ACK4 for permitting the occupation of the bus 30 through the bus 31 to the CPU 50, the IF circuit 51, the data check circuit 52, and the DSP 53, respectively. The arbiter 21 according to an embodiment of the present invention includes a register (not shown) that stores priority data indicative of the priority of the input request signals REQ1 to REQ4. The arbiter 21 arbitrates the right to use the bus 30 based on the request signals REQ1 to REQ4 and the priorities of the request signals REQ1 to REQ4. Specifically, for example, if a plurality of request signals are input with the same timing, the arbiter 21 sequentially outputs the permission signals corresponding to request signals with higher priority. On the other hand, for example, if the request signals REQ1 to REQ4 are input to the arbiter 21 with uncompetitive timings, the arbiter 21 outputs the permission signals ACK1 to ACK4 corresponding to the input request signals REQ1 to REQ4. A period during which each of the bus masters is allowed to occupy the bus 30 is determined based on the request signals REQ1 to REQ4, for example. The priorities of the input request signals REQ1 to REQ4, i.e., the priority data set in the register is set by a host microcomputer (not shown) that controls the system LSI 10. Therefore, the priorities of the input request signals REQ1 to REQ4 can be changed. Although details will be described later, the bus 31 includes wiring for the request signals REQ1 to REQ4 and the permission signals ACK1 to ACK4.

The memory controller 22 controls storing of data into the SRAM 20 and reading of data stored in the SRAM 20 based on the permission signals ACK1 to ACK4 from the arbiter 21 and the instructions from the CPU 50, the IF circuit 51, the data check circuit 52, and the DSP 53. For example, when the permission signal ACK1 is input to the memory controller 22, if an access instruction is input from the CPU 50 to the SRAM 20, the memory controller 22 accesses the SRAM 20 in accordance with the access instruction from the CPU 50. When the permission signals ACK2 to ACK4 are input to the memory controller 22, if an access instruction is input from each of the IF circuit 51, the data check circuit 52, and the DSP 53, the memory controller 22 operates similarly.

The CPU 50 executes the program data stored in the SRAM 20, to integrally control the system LSI 10. The CPU 50 outputs the request signal REQ1 to the arbiter 21 to acquire the program data of the SRAM 20. When the permission signal ACK1 is input, the CPU 50 acquires the program data from the SRAM 20 through the bus 30 and the memory controller 22. The CPU 50 controls each of the IF circuit 51, the data check circuit 52, and the DSP 53 through the bus 32.

The IF circuit 51 stores in the SRAM 20 the program data of the CPU 50 stored in the serial flash memory 11. The IF circuit 51 acquires the program data stored in the serial flash memory 11 and outputs the request signal REQ2 to the arbiter 21 based on the instruction from the CPU 50. When the permission signal ACK2 is input, the IF circuit 51 stores in the SRAM 20 the program data acquired from the serial flash memory 11 through the bus 30 and the memory controller 22. The IF circuit acquires the error detecting code stored in the serial flash memory 11 to be stored in a register, which will be described later, provided in the data check circuit 52, based on the instruction from the CPU 50.

The data check circuit 52 checks the program data stored in the SRAM 20. The data check circuit 52 outputs the request signal REQ3 to the arbiter 21 to acquire the program data of the SRAM 20 based on the instruction from the CPU 50. When the permission signal ACK3 is input, the data check circuit 52 acquires the program data through the bus 30 and the memory controller 22. The data check circuit 52 executes error detection processing for the acquired program data so as to determine whether or not the program data is correct. Specifically, for example, if the error detecting code stored in the serial flash memory 11 is a checksum, the data check circuit 52 calculates the checksum of the program data acquired from the SRAM 20. The details of the data check circuit 52 will be described later.

The DSP 53 executes various calculations for controlling an optical disc reproducing device (not shown), for example. When executing arithmetic processing, the DSP 53 uses the SRAM 20 as a so-called buffer memory. The DSP 53 outputs the request signal REQ4 to the arbiter 21 to access the SRAM 20, based on the instruction from the CPU 50. When the permission signal ACK4 is input, the DSP 53 accesses the SRAM 20 through the bus 30 and the memory controller 22.

<<First Embodiment of Data Check Circuit 52>>

Figure 2:
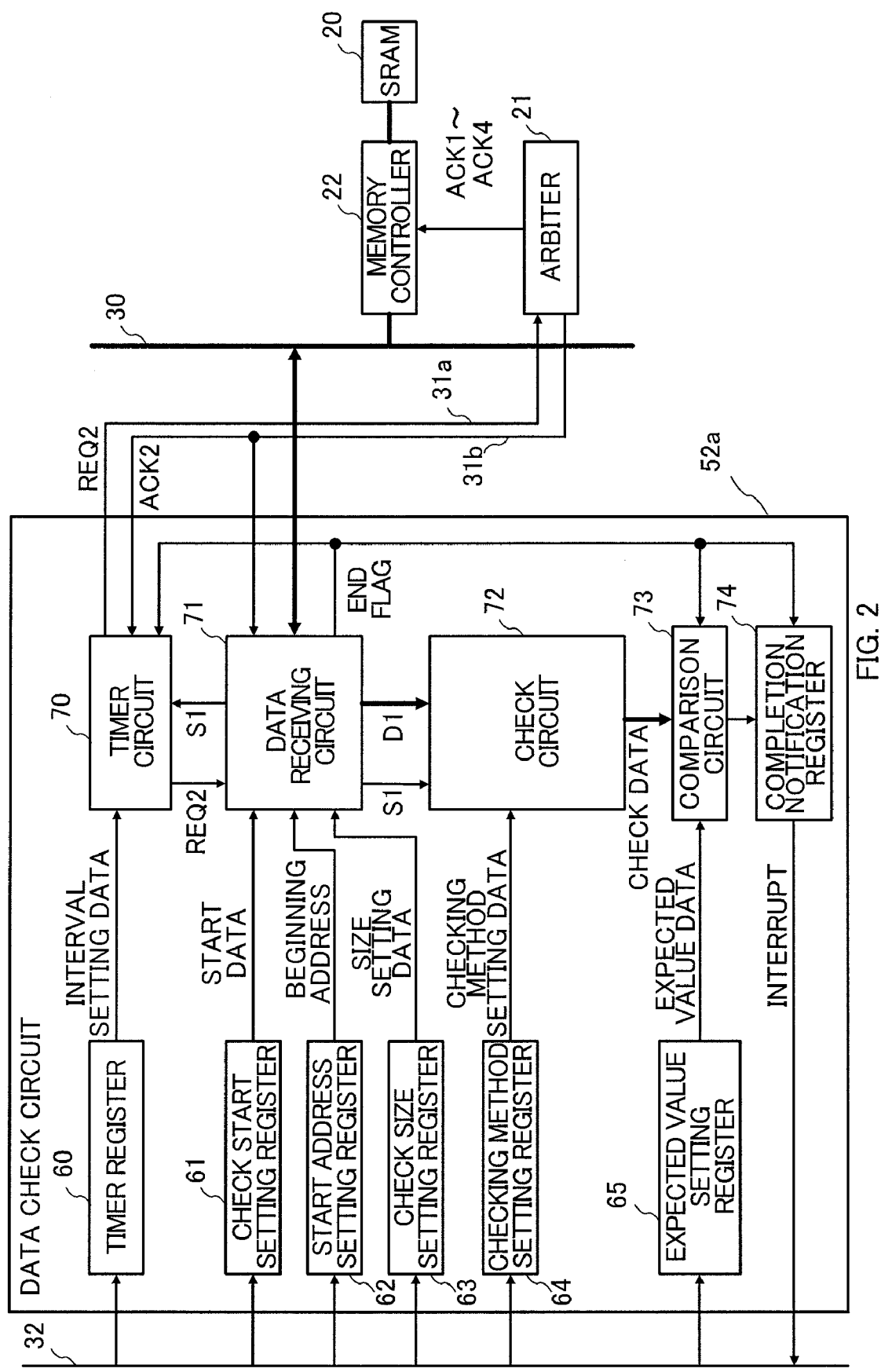

A first embodiment of a data check circuit 52a will be described with reference to FIG. 2. The data check circuit 52a not only calculates the error detecting code of the program data acquired from the SRAM 20, but also compares the calculation result with the error detecting code stored in the flash memory 11. The data check circuit 52a includes a timer register 60, a check start setting register 61, a start address setting register 62, a check size setting register 63, a checking method setting register 64, an expected value setting register 65, a timer circuit 70, a data receiving circuit 71, a check circuit 72, a comparison circuit 73, and a completion notification register 74. The timer register 60 and the timer circuit 70 make up a request signal output circuit.

The timer register 60 (setting data storage circuit) stores interval setting data for setting an interval of the request signal REQ2 output from the data check circuit 52a.

The check start setting register 61 stores start data for allowing the data check circuit 52a to start checking of the program data.

The start address setting register 62 stores a beginning address indicative of the beginning of the storage area having the program data stored therein in the storage area of the SRAM 20.

The check size setting register 63 stores size setting data indicative of a data size of the program data to be checked by the data check circuit 52a.

The checking method setting register 64 stores checking method setting data for setting a method of checking whether or not the program data is correct, i.e., a method of calculating the error detecting code of the program data. As described above, the error detecting code generated and stored in the serial flash memory 11 is a checksum or parity, for example. Therefore, the checking method setting data according to an embodiment of the present invention is data indicative of either a checksum or parity.

The expected value setting register 65 (reference data storage circuit) stores the error detecting code of the program data in the storage area that is specified to be checked by the data check circuit 52a among the error detecting codes stored in the flash memory 11. Specifically, the expected value setting register 65 stores, as the expected value data, either a checksum for the program data in the specified storage area or parity for the program data in the specified storage area.

Various data stored in the registers of the timer register 60 to the expected value setting register 65 are set by the CPU 50 through the bus 32.

The timer circuit 70 (request signal generation circuit) is a circuit that outputs the request signal REQ2 at intervals corresponding to the interval setting data. Specifically, when a start signal S1 indicative of the start of the checking is input from the data receiving circuit 71, which will be described later, the timer circuit 70 outputs, for example, a high-level (hereinafter referred to as "high") request signal REQ2 to the arbiter 21 and the data receiving circuit 71 at intervals corresponding to the interval setting data. If the permission signal ACK2 is output from the arbiter 21, the timer circuit 70 changes the request signal REQ2 to a low level (hereinafter referred to as "low"). When an end flag, which will be described later, is set to "1", the time circuit 70 stops the output of the request signal REQ2. Here, it is assumed that the output of the request signal REQ2 indicates turning the request signal REQ2 to "high" and stopping the output of the request signal REQ2 indicates turning the request signal REQ2 to "low".

In an embodiment of the present invention, the request signal REQ2 is output to the arbiter 21 through a line 31a in the bus 31 and the permission signal ACK2 is output to the timer circuit 70 through a line 31b in the bus 31. Although not depicted in FIG. 2, it is assumed that dedicated lines are allocated to other request signals and permission signals, respectively, as is the case with the request signal REQ2 and the permission signal ACK2.

Figure 3:
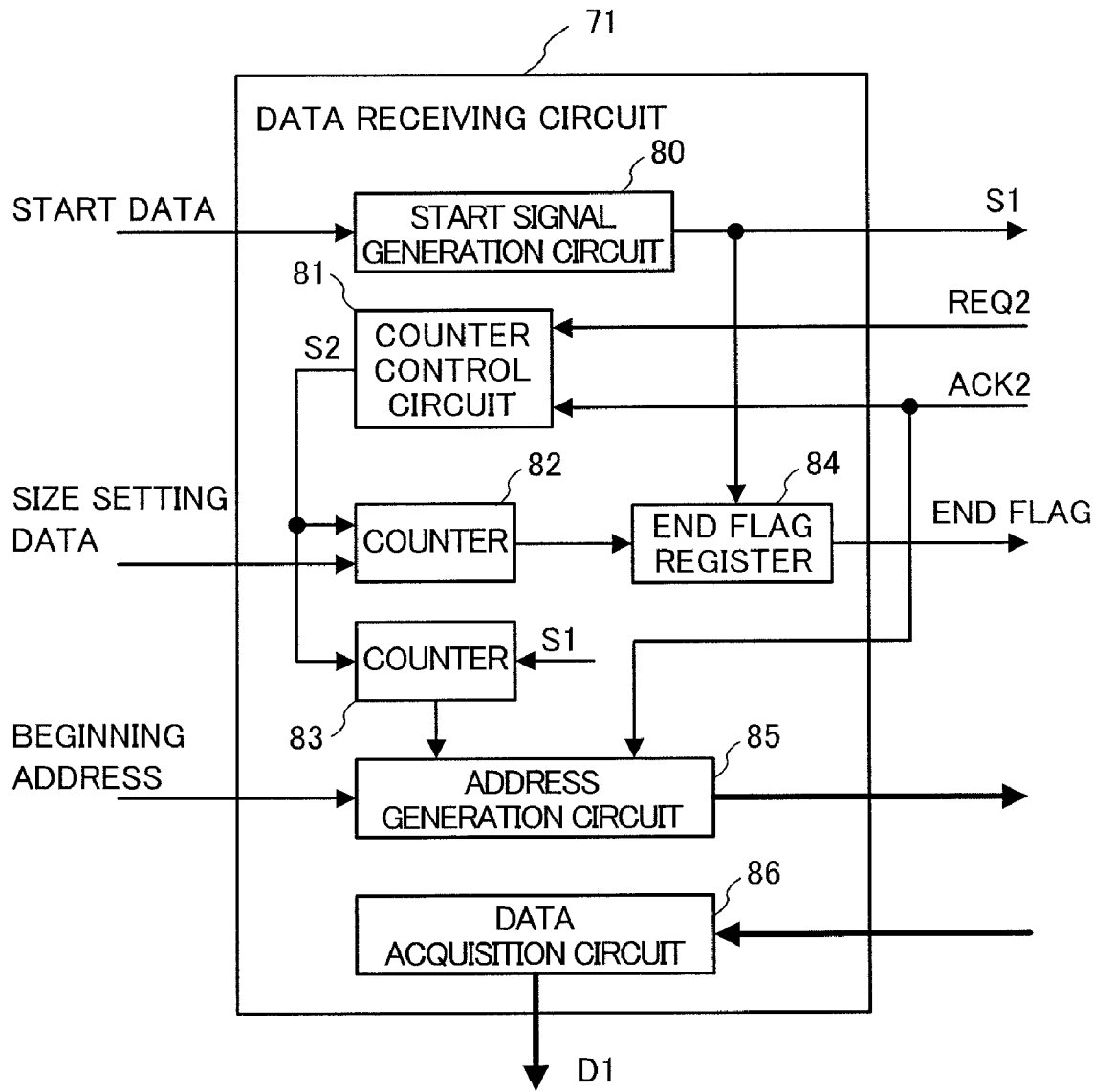
FIG. 3 is a diagram illustrating a configuration of a data receiving circuit 71.

The data receiving circuit 71 is a circuit that sequentially acquires, piece by piece, the program data specified based on the beginning address and the size setting data, each time the permission signal ACK2 is input. As depicted in FIG. 3, the data receiving circuit 71 includes a start signal generation circuit 80, a counter control circuit 81, counters 82, 83, an end flag register 84, an address generation circuit 85, and a data acquisition circuit 86. The counter control circuit 81, the counter 82, and the end flag register 84 make up a stop circuit.

When the start data is input, the start signal generation circuit 80 generates the start signal S1 for starting the checking of the program data.

The counter control circuit 81 outputs a signal S2 for changing count values of the counters 82 and 83, each time the request signal REQ2 goes from "high" to "low".

The counter 82 stores a count value based on the size setting data as an initial value. When the signal S2 is input, the counter 82 decrements the count value by a value corresponding to a data size of data, which is acquired by the data receiving circuit 71 each time the permission signal ACK2 is input to the data receiving circuit 71. For example, if a data size of the program data to be acquired is 2 KB (kilobytes), "2048" is stored as a count value. If data of a data size of one byte is acquired each time the permission signal ACK2 is input, the counter 82 decrements the count value by "1" each time. Therefore, the count value of the counter 82 indicates a remaining data size of the program data to be acquired by the data receiving circuit 71.

The counter 83 is a so-called address counter that is used when the address generation circuit 85, which will be described later, generates an address. When the start signal S1 is input, the counter 83 resets the count value to "0". When the signal S2 is input, the counter 83 increments the count value by a value corresponding to a data size of data, which is acquired each time the permission signal ACK2 is input thereto. For example, if one-byte data is acquired each time the permission signal ACK2 is input, the count value of the counter 83 is increments by "1" each time.

The end flag register 84 stores an end flag indicative of whether or not the count value of the counter 82 is "0", i.e., whether the program data to be acquired has completely been acquired by the data receiving circuit 71. In an embodiment according to the present invention, if the count value is "0", i.e., if the program data to be acquired has completely been acquired, the end flag is set to "1". On the other hand, if the count value is not "0", the end flag is set to "0". The end flag register 84 clears the end flag ("0") when the start signal S1 is input thereto.

As described above, when the end flag is set to "1", the output of the request signal REQ2 is stopped. Therefore, if the end flag is set to "1", the data receiving circuit 71 stops acquiring the program data.

The address generation circuit 85 generates an address of the storage area that stores the program data to be acquired, based on the beginning address and the count value of the counter 83. When the permission signal ACK2 is input, the address generation circuit 85 outputs the generated address to the memory controller 22 through the bus 30. For example, if one-byte program data is acquired each time the permission signal ACK2 is input, the address generation circuit 85 generates such an address that the program data can be acquired by one byte at a time from the beginning address, based on the count value of the counter 83. For example, if the count value of the counter 83 is "0", the address generation circuit 85 outputs the beginning address as an address to be accessed. When outputting the address to be accessed, the address generation circuit 85 according to an embodiment of the present invention also outputs a lead command for allowing the memory controller 22 to acquire the program data.

The data acquisition circuit 86 acquires the program data that is output in accordance with the address output from the address generation circuit 85. The data acquisition circuit 86 transfers the acquired program data to the check circuit 72 to determine whether or not the program data is incorrect. In an embodiment of the present invention, the data output from the data acquisition circuit 86 is referred to as data D1.

As such, the data receiving circuit 71 according to an embodiment of the present invention sequentially acquires, piece by piece, the program data stored in the specified storage area of the SRAM 20 based on the start data. The data receiving circuit 71 stops acquiring the program data when the program data in the specified storage area has completely been acquired.

Waveforms of the request signal REQ2 output by the data receiving circuit 71 will be described with reference to FIG. 4. It is hereinafter assumed in an embodiment of the present invention that a data size of data is one byte, for example, which is acquired by the data receiving circuit 71 each time the permission signal ACK is output thereto.

Figure 4:
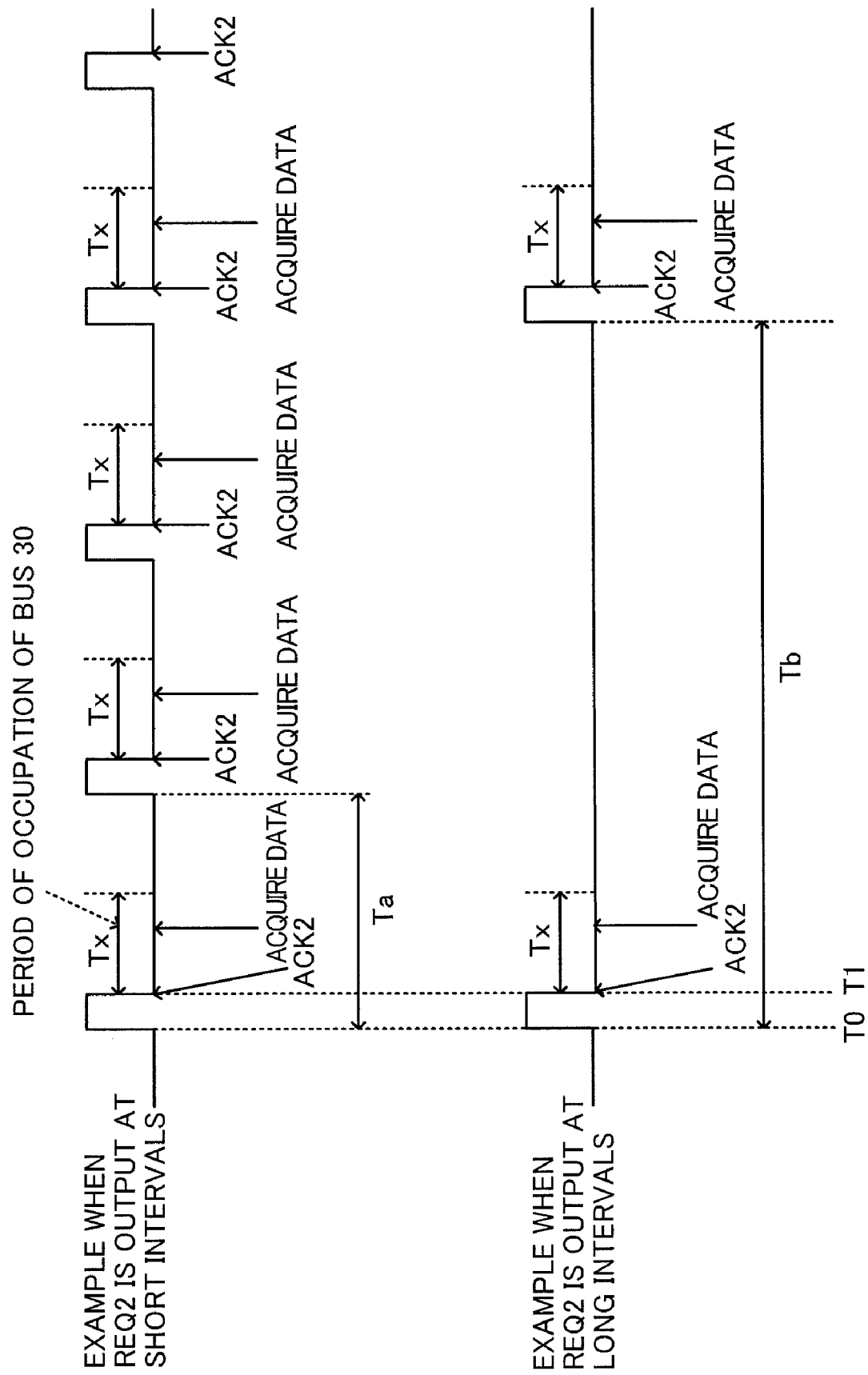
FIG. 4 is a diagram illustrating an example of a waveform of a request signal REQ2.

The upper side of FIG. 4 depicts an example of a waveform when the request signal REQ2 is output at short intervals. Here, it is assumed that no request signal other than the request signal REQ2 is input to the arbiter 21. For example, when the request signal REQ2 goes "high" at a time T0, the arbiter 21 outputs the permission signal ACK2 at a time T1 in response to the request signal REQ2. As a result, the bus 30 is occupied by the data check circuit 52a and the data acquisition circuit 86 acquires one-byte data as above. Therefore, each time the request signal REQ2 goes "high" in a cycle Ta, one-byte data is acquired in the cycle Ta. If a cycle Tb in which the request signal REQ2 is generated is set longer than the cycle Ta, the intervals at which the data acquisition circuit 86 acquires one-byte data also becomes longer as depicted in the lower side of FIG. 4, for example. As such, the data receiving circuit 71 may acquire the specified program data earlier in time as the request signal REQ2 is output at shorter intervals (intervals in which the signal goes "high").

Figure 5:
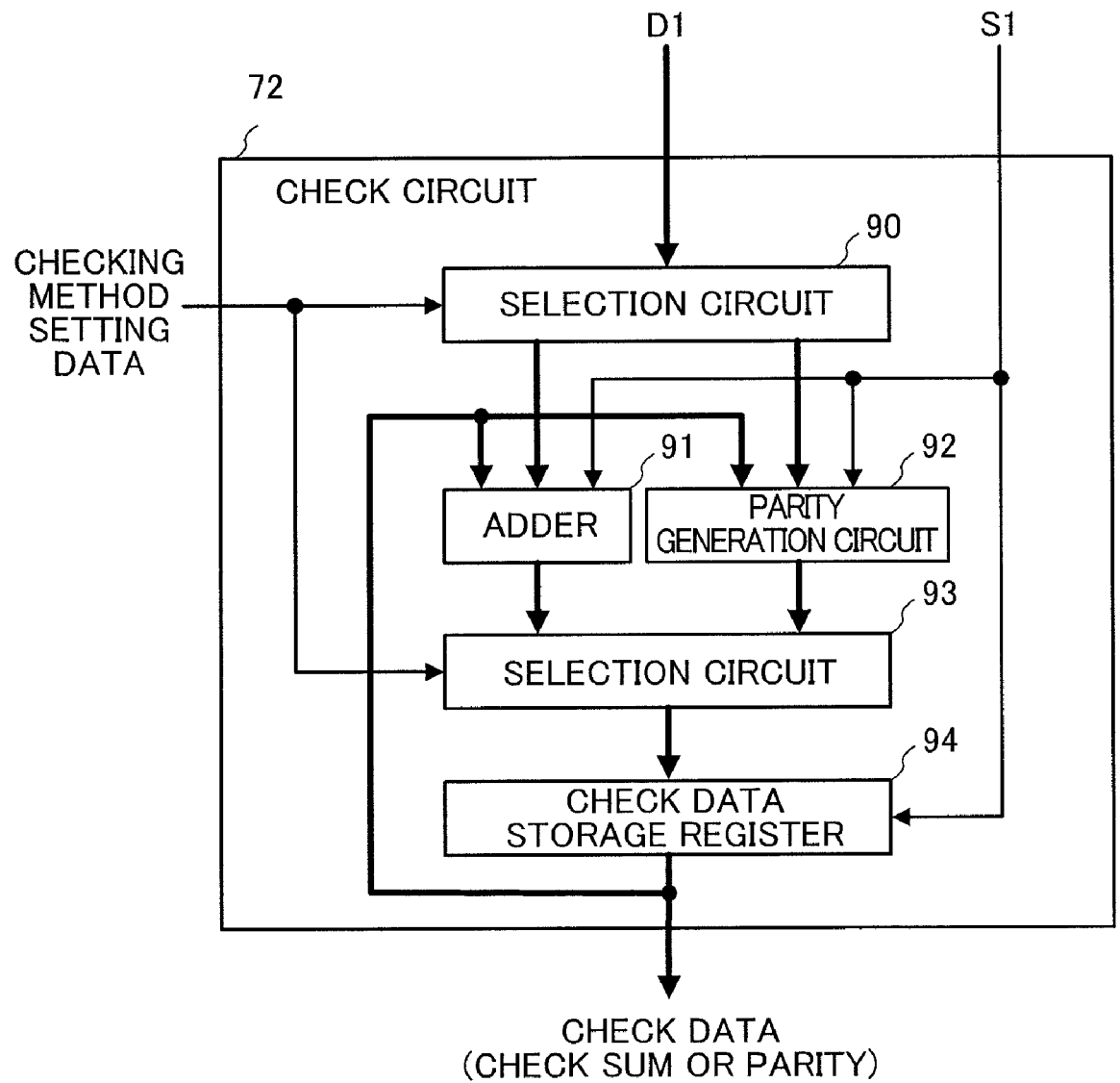
FIG. 5 is a diagram illustrating a configuration of a check circuit 72.

As depicted in FIG. 5, the check circuit 72 (data processing circuit) includes selection circuits 90, 93, an adder 91, a parity generation circuit 92, and a check data storage register 94.

The selection circuit 90 outputs the input data D1 to either the adder 91 or the parity generation circuit 92 based on the checking method setting data. If data indicative of a checksum is input as the checking method setting data, the selection circuit 90 outputs the data D1 to the adder 91. On the other hand, if data indicative of parity is input as the checking method setting data, the selection circuit 90 outputs the data D1 to the parity generation circuit 92. The selection circuit 90 may be implemented using a multiplexer, for example.

The adder 91 adds the input data D1 and the data stored in the check data storage register 94, to be output to the selection circuit 93. The adder 91 may be implemented using a full adder, for example.

The parity generation circuit 92 generates the parity to be output to the selection circuit 93 based on the input data D1 and the data stored in the check data storage register 94.

Firstly, the parity generation circuit 92 calculates the exclusive OR of the data D1 to generate the parity for the data D1. Subsequently, the parity generation circuit 92 calculates the exclusive OR of the parity for the data D1 and the data stored in the check data storage register 94, to generate the parity.

If data indicative of a checksum is input as the checking method setting data, the selection circuit 93 stores the output from the adder 91 in the check data storage register 94. On the other hand, if data indicative of parity is input as the checking method setting data, the selection circuit 93 stores the output from the parity generation circuit in the check data storage register 94. The selection circuit 93 may be implemented using a multiplexer, for example, as is the case with the selection circuit 90.

The selection circuit 90, the adder 91, the selection circuit 93, and the check data storage register 94 add the data D1 which is sequentially input, and therefore they operate as a circuit for calculating the checksum. On the other hand, the selection circuit 90, the parity generation circuit 92, the selection circuit 93, and the check data storage register 94 calculate the exclusive OR for all the pieces of the data D1 which is sequentially input. Therefore, these circuits operate as a circuit for calculating the parity for all the pieces of the data D1 which is sequentially input. The check circuit 72 according to an embodiment of the present invention operates as a circuit for calculating the checksum if the checksum is specified as the checking method, and operates as a circuit for calculating the parity if the parity is specified as the checking method. In an embodiment of the present invention, the data stored in the check data storage register 94 is referred to as check data. The data stored in the adder 91 and the parity generation circuit 92 according to an embodiment of the present invention and the check data are cleared by the start signal S1.

When the end flag is set to "1", the comparison circuit 73 compares the expected value data with the check data, and stores the comparison result in the completion notification register 74. In an embodiment of the present invention, the comparison result is set to "0" if the expected value data and the check data matches, and the comparison result is set to "1" if the expected value data and the check data do not match.

If the end flag is set to "1" and the comparison result is stored, the completion notification register 74 notifies the CPU 50 of an interrupt indicative of the end of the checking of the program data through the bus 32.

<Example Of Checking Processing of Program Data>

Figure 6:
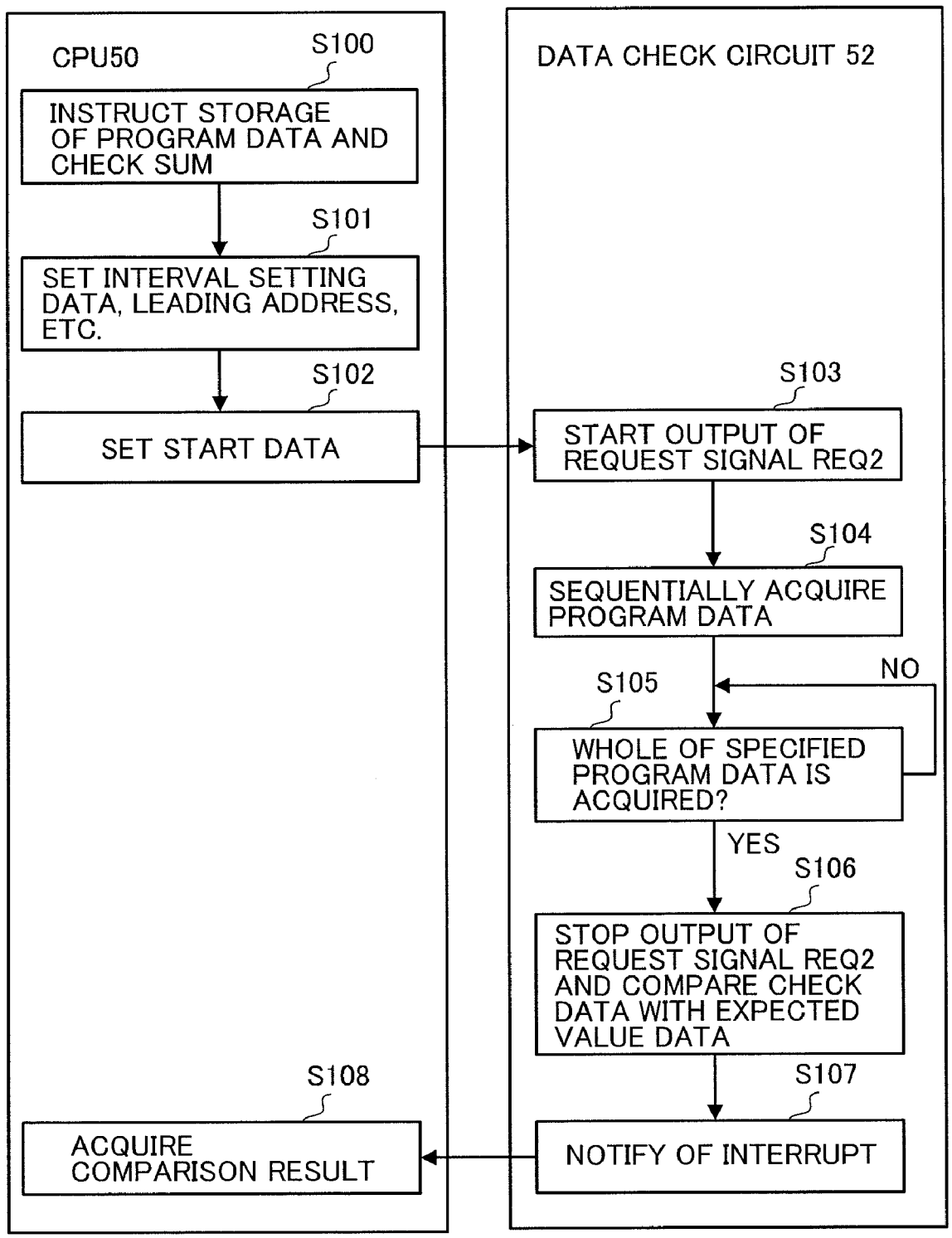
FIG. 6 is a schematic diagram illustrating processing executed by a CPU 50 and a data check circuit 52.

Description will be made of an example of an operation of the system LSI 10 when the data check circuit 52a checks the program data, with reference to FIG. 6. FIG. 6 depicts a schematic diagram of the processing executed by the CPU 50 and the data check circuit 52. Here, it is assumed that the serial flash memory 11 generates and stores a checksum based on the program data.

When the system LSI 10 is started, the CPU 50 outputs an instruction for allowing the IF circuit 51 to acquire the program data stored in the serial flash memory 11 and store the program data in the SRAM 20. Furthermore, the CPU 50 outputs an instruction for allowing the IF circuit 51 to acquire the checksum stored in the serial flash memory 11 and store the checksum in the expected value setting register 65 (S100). As a result, the program data is stored in the SRAM 20 through the IF circuit 51, the bus 30, and the memory controller 22. The checksum is stored in the expected value setting register 65 as the expected value data through the IF circuit 51 and the bus 32. The checksum stored in the expected value setting register 65 is the checksum for the program data acquired from the serial flash memory 11 by the IF circuit 51. The CPU 50 sets the interval setting data, the beginning address, the size setting data, and the checking method setting data in the timer register 60, the start address setting register 62, the check size setting register 63, and the checking method setting register 64, respectively, so as to check the program data stored in the SRAM 20 (S101). In an embodiment of the present invention, the size setting data is set such that the entire data size of the program data stored in the SRAM 20 may be checked. The data indicative of the checksum is set as the checking method setting data.

In general, an error often occurs when the program data is transferred from the serial flash memory 11 to the SRAM 20. Therefore, for example, immediately after the system LSI 10 is started, the program data is required to be checked in a short time on a priority basis. Therefore, in the processing S101, the CPU 50 according to an embodiment of the present invention sets such an interval setting data that the request signal REQ2 is output at shorter intervals as indicated by the cycle Ta in FIG. 4, for example. The CPU 50 sets the start data in the check start setting register 61 so as to start the checking of the program data (S102).

When the start data is set, the timer circuit 70 starts outputting the request signal REQ2 (S103). The data acquisition circuit 86 sequentially acquires one byte of the program data from the beginning address of the storage area, having the program data stored therein, each time the permission signal ACK2 is output (S104). Since the program data is required to be checked on a priority basis as above immediately after the startup, it is assumed that the request signal REQ2 in the arbiter 21 is given a higher priority than the request signals REQ1 and REQ4, for example. The processing S104 is continued until the whole of the program data transferred to the SRAM 20 has been acquired (S105: NO). When the whole of the program data is acquired (S105: YES), the end flag is set to "1", and thus, the output of the request signal REQ2 is stopped (S106). The comparison circuit 73 compares the checksum (check data) calculated by the check circuit 72 with the checksum (expected value data) stored in the expected value setting register 65 (S106). When the comparison result is stored in the completion notification register 74, the completion notification register 74 notifies the CPU 50 of an interrupt (S107). As a result, the CPU 50 acquires the comparison result (S108). As above, the CPU 50 is able to acquire the result of whether or not the program data is correct without executing processing of checking the program data stored in the SRAM 20 directly.

If the comparison result is "0", the CPU 50 determines that the program data is normal. The CPU 50 then acquires and executes the program data stored in the SRAM 20, for example. An error may occur in the program data stored in the SRAM 20 afterward. Therefore, the CPU 50 allows the data check circuit 52a to check the program data stored in the SRAM 20 on a regular basis.

In general, there is a low possibility that an error occurs in the program data afterward. Therefore, after the CPU 50 confirms that the program data is normal, it is preferred that a higher priority is given to processing other than the checking of the program data. Therefore, in such a case, the CPU 50 sets the intervals, at which the request signal REQ2 is output, longer than the cycle Ta, which is a cycle immediately after the startup, as indicated by a cycle Tb in FIG. 4, for example. The host microcomputer (not shown) that controls the system LSI 10 gives the request signal REQ2 in the arbiter 21 a lower priority than the request signals REQ1 and REQ4, for example. As a result, the CPU 50 and the DSP 53 may easily occupy the bus 30, and the system LSI 10 is able to efficiently execute regular processing other than the checking of the program data.

If the comparison result is "1", the CPU 50 determines that the program data is abnormal. In such a case, the CPU 50 may malfunction when executing the program data stored in the SRAM 20. Therefore, if the comparison result is "1", the CPU 50 allows the program data to be stored again in the SRAM 20 from the serial flash memory 11. The CPU 50 outputs various instructions so that the processing S101 to S108 described in FIG. 6 is executed again. If the comparison result is "1", the program data is stored in the SRAM 20 again from the serial flash memory 11 in an embodiment of the present invention, however, the checking (S100 to S108) may be executed again, for example. Moreover a configuration may be made such that the program data may be stored in the SRAM 20 again from the serial flash memory 11 if the comparison result is "1" twice in series, for example.

<<Second Embodiment of Data Check Circuit 52>>

Figure 7:
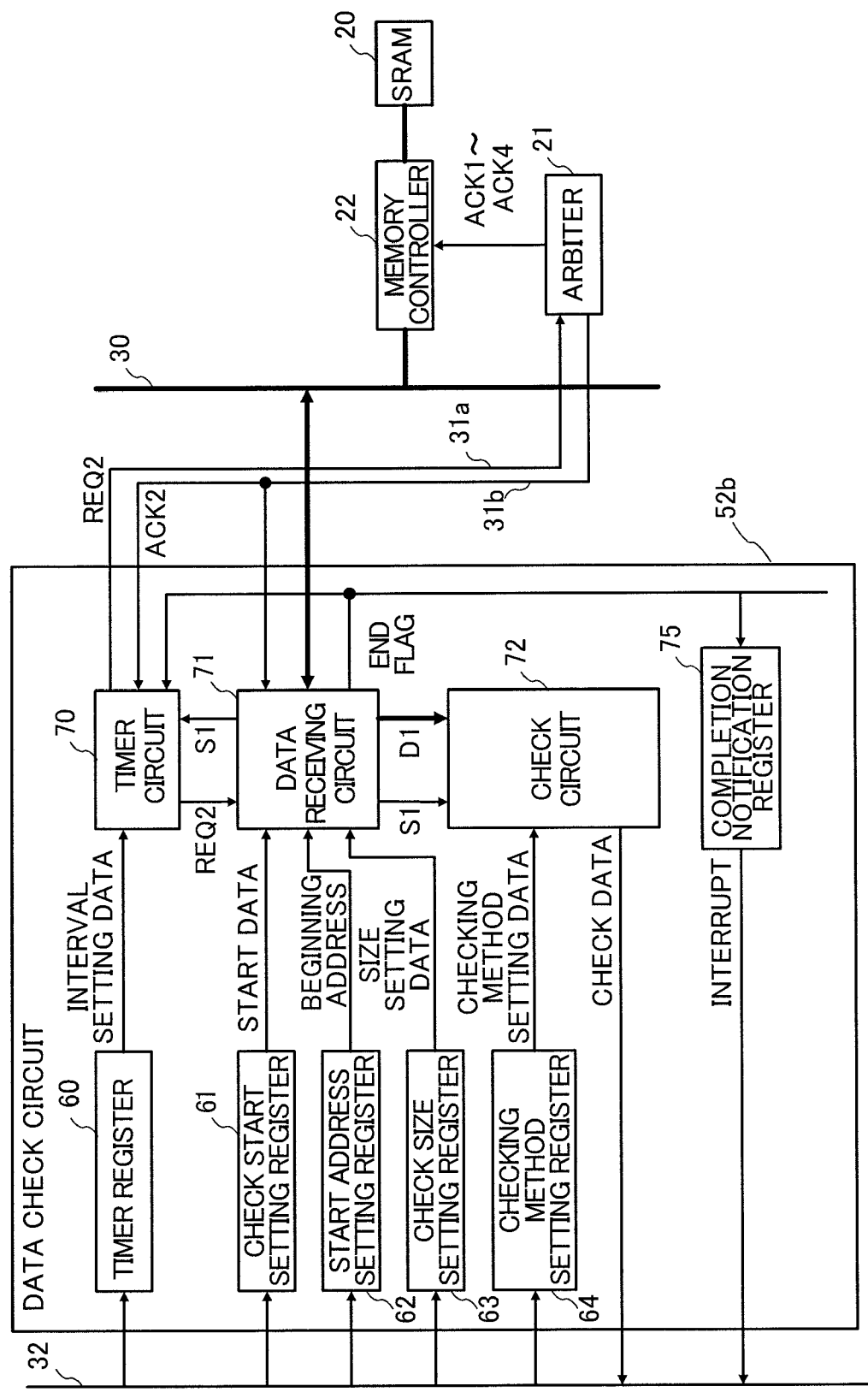
FIG. 7 is a diagram illustrating a configuration of a data check circuit 52b.

FIG. 7 depicts a data check circuit 52b, which corresponds to a second embodiment of the data check circuit 52. The data check circuit 52b calculates the error detecting code of the acquired program data and allows the CPU 50 to acquire the calculation result in order to determine whether or not the program data is correct. That is, the data check circuit 52b allows the CPU 50 to determine whether or not the program data is correct. Therefore, the data check circuit 52b includes the circuits in the data check circuit 52a depicted in FIG. 2 except the expected value setting register 65 and the comparison circuit 73. The completion notification register 75 in the data check circuit 52b notifies the CPU 50 of an interrupt if the end flag "1" is stored.

When the CPU 50 is notified of the interrupt, the CPU 50 accesses the check data storage register 94 to acquire the check data (error detecting code). The CPU 50 acquires the error detecting code from the serial flash memory 11, to be compared with the check data. As such, the data check circuit 52b acquires the program data to execute the calculation of the error detecting code based on the instruction from the CPU 50. Therefore, for example, the load of the CPU 50 is reduced as compared to the case where the CPU 50 is allowed to acquire the program data and calculate the error detecting code.

In the system LSI 10 according to an embodiment of the present invention with the configuration described above, the checking of the program data in the SRAM 20 is started based on the instruction of the CPU 50 that integrally controls the system LSI 10. Thus, the data check circuit 52 is able to check the program data in an appropriate timing. The CPU 50 is able to execute other processing while the data check circuit 52 acquires and checks the program data. Therefore, an embodiment of the present invention may increase the efficiency of the processing in the system LSI 10.

The data check circuit 52 according to an embodiment of the present invention sequentially acquires one byte of the program data from the beginning address, each time the permission signal ACK2 is output. Therefore, the data check circuit 52 does not continue to occupy the bus 30 when acquiring the program data. Therefore, while the data check circuit 52 checks the program data, the DSP 53, etc., are able to access the SRAM 20, for example.

The data receiving circuit 71 according to an embodiment of the present invention allows the timer circuit 70 to stop the output of the request signal REQ2 if the whole of the specified program data has been acquired, i.e., if the size of the acquired program data reaches the size of the storage area that is specified based on the size setting data. The data check circuit 52 checks the specified program data (S103 to S107). Therefore, once the CPU 50 allows the data check circuit 52 to start the checking of the program data, the CPU 50 does not have to output an additional instruction. Therefore, the data check circuit 52 may reduce the load of the CPU 50.

The comparison circuit 73 in the data check circuit 52a compares the checksum calculated by the check circuit 72 with the checksum stored in the expected value setting register 65. Therefore, the load of the CPU 50 may be reduced as compared to the case where the CPU 50 is allowed to compare the checksum calculated by the check circuit 72 with the checksum stored in the serial flash memory 11, for example.

The timer circuit 70 according to an embodiment of the present invention outputs the request signal REQ2 at intervals based on the interval setting data. Therefore, the request signal REQ2 may be output at shorter intervals immediately after the system LSI 10 is started, and the request signal REQ2 may be output at longer intervals once the program data is checked, for example. Therefore, the data check circuit 52 according to an embodiment of the present invention is able to efficiently execute the checking of the program data depending on the situation.

The above embodiments of the present invention are simply for facilitating the understanding of the present invention and are not in any way to be construed as limiting the present invention. The present invention may variously be changed or altered without departing from its spirit and encompass equivalents thereof.

For example, in an embodiment of the present invention, the SRAM 20 included in the system LSI 10 stores the program data, however, this is not limitative. For example, DRAM (Dynamic Random Access Memory), etc., may be provided on the outside of the system LSI 10 instead of the SRAM 20, to store the program data in the DRAM.

In an embodiment of the present invention, an interrupt occurs in the data check circuit 52 when the checking of the program data has been completed, however, this is not limitative. For example, the CPU 50 may access the completion notification register 74 through polling to read the end flag and the comparison result.

In an embodiment of the present invention, the entire program data stored in the SRAM 20 is checked at one time, however, this is not limitative. For example, if the data size of the program data is large, the storage area having the program data stored therein may be divided into a plurality of areas and the data check circuit 52 may perform the checking for each of the divided areas.

The data check circuit 52 according to an embodiment of the present invention is configured so as to sequentially acquire one byte of the program data from the beginning address each time the permission signal ACK2 is output, however, this is not limitative. For example, a configuration may be made such that in a case where a period, during which the data check circuit 52 occupies the bus 30, varies based on the output of the arbiter 21, the data check circuit 52 acquires the program data of a data size corresponding to the period, during which the bus 30 is occupied, upon the output of the permission signal ACK2. Specifically, a configuration may be made such that the data check circuit 52 acquires one byte of the program data if the bus 30 is occupied for a short period, and acquires two bytes of the program data if the bus 30 is occupied for a long period, for example. Such a configuration is also able to reduce the load of the CPU 50, as in an embodiment of the present invention.

What is claimed is:

1. A data check circuit comprising:
   a request signal output circuit configured to output a request signal for requesting occupation of a bus to an arbitration circuit configured to arbitrate the occupation of the bus, when a CPU connected, as a bus master, with the bus for accessing a memory outputs an instruction signal for providing an instruction for starting detection of whether or not data stored in the memory is correct;

a data acquisition circuit configured to acquire data stored in the memory through the bus, when the arbitration circuit outputs a permission signal for permitting the occupation of the bus based on the request signal; and a data processing circuit configured to perform processing for detecting whether or not the acquired data is correct, the acquired data acquired by the data acquisition circuit.

2. The data check circuit of claim 1, wherein the request signal output circuit outputs the request signal at predetermined intervals to allow the arbitration circuit to output the permission signal at the predetermined intervals, when the instruction signal is input to the request signal output circuit, and wherein the data acquisition circuit sequentially acquires data in a storage area of the memory, piece by piece, each time the permission signal is output, the storage area having data to be acquired by the data acquisition circuit stored therein.

3. The data check circuit of claim 2, further comprising a stop circuit configured to allow the request signal output circuit to stop output of the request signal, when a total data size of the acquired data acquired by the data acquisition circuit reaches a size of the storage area.

4. The data check circuit of claim 2, wherein the request signal output circuit includes a setting data storage circuit configured to store setting data for setting intervals at which the request signal is output, and a request signal generation circuit configured to generate the request signal at the predetermined intervals based on the setting data, when the instruction signal is input thereto.

5. The data check circuit of claim 3, further comprising a reference data storage circuit configured to store reference data serving as a reference for detecting whether or not the acquired data is correct, and a comparison circuit configured to compare a processing result of the data processing circuit with the reference data, when the stop circuit stops the output of the request signal.

6. The data check circuit of claim 3, wherein the request signal output circuit includes a setting data storage circuit configured to store setting data for setting intervals at which the request signal is output, and a request signal generation circuit configured to generate the request signal at the predetermined intervals based on the setting data, when the instruction signal is input thereto.

7. The data check circuit of claim 5, wherein the request signal output circuit includes a setting data storage circuit configured to store setting data for setting intervals at which the request signal is output, and a request signal generation circuit configured to generate the request signal at the predetermined intervals based on the setting data, when the instruction signal is input thereto.

* * * * *